Oct. 27, 1970 W. W. EGEE 3,535,735
EXTRUDING APPARATUS AND SYSTEM
Filed Feb. 16, 1968 3 Sheets-Sheet 2

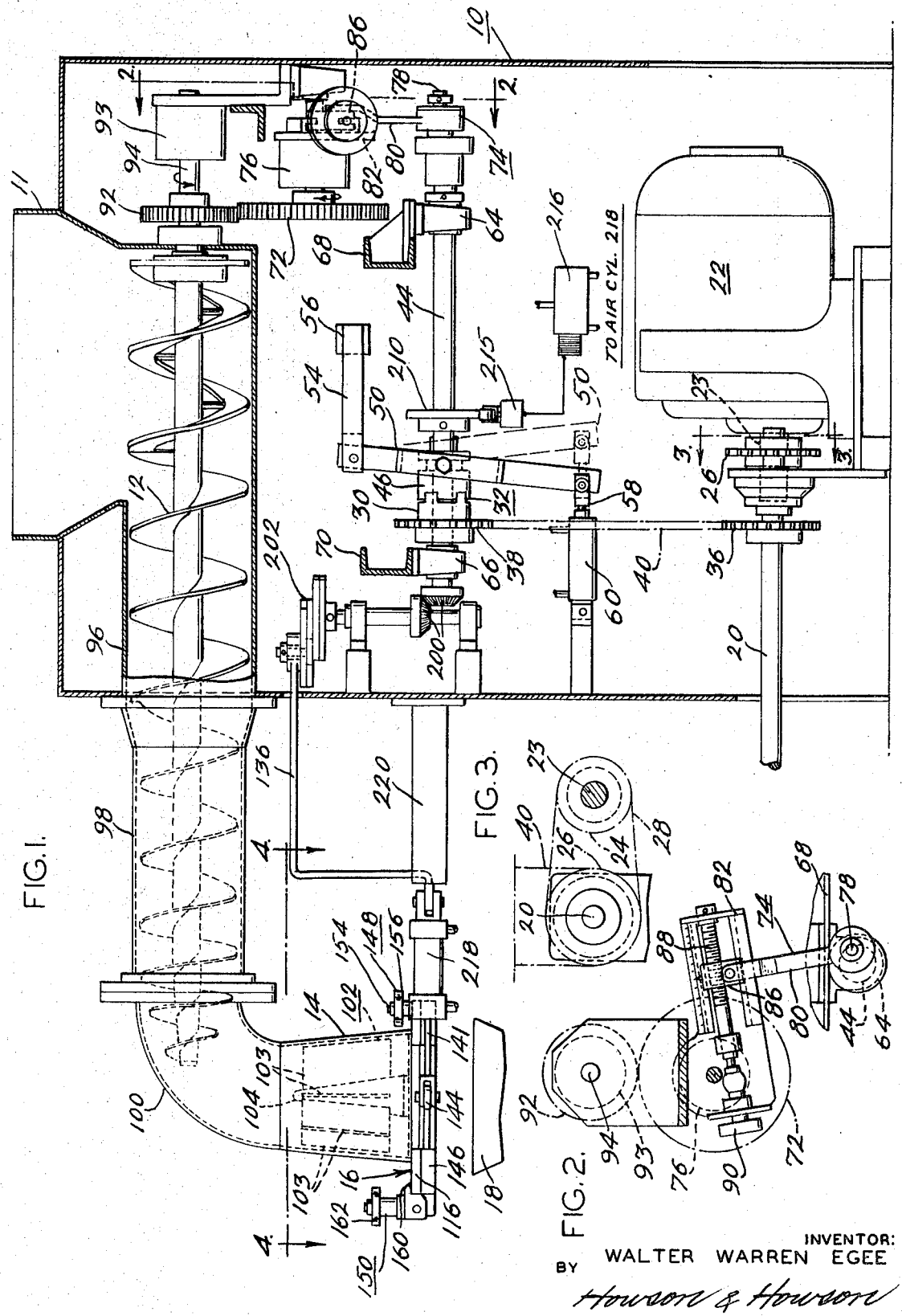

INVENTOR:
WALTER WARREN EGEE
BY Howson & Howson
ATTYS.

Oct. 27, 1970 — W. W. EGEE — 3,535,735
EXTRUDING APPARATUS AND SYSTEM
Filed Feb. 16, 1968 — 3 Sheets-Sheet 3
FIG. 6.
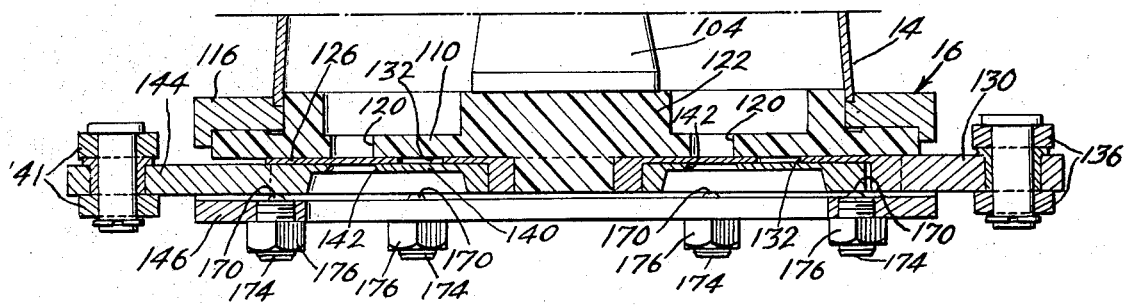
FIG. 7a.
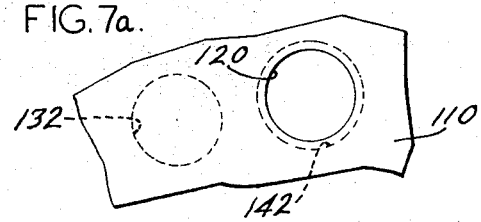
FIG. 8a.
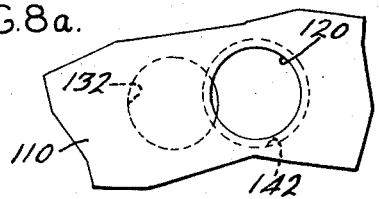
FIG. 7.
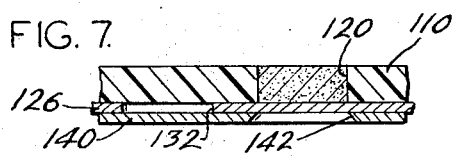
FIG. 8.
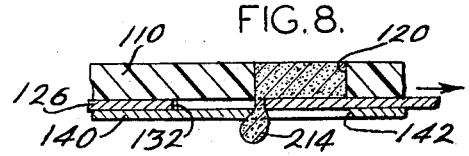
FIG. 9a.
FIG. 10a.
FIG. 9.
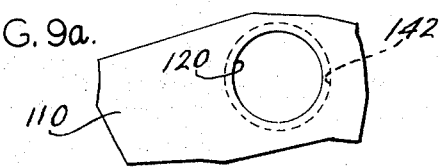
FIG. 10.
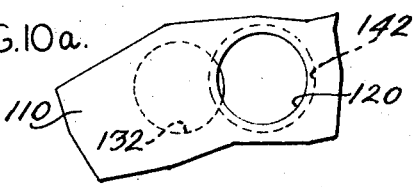
FIG. 11a.
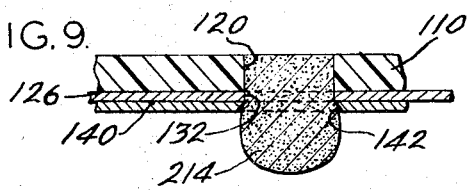
FIG. 11.
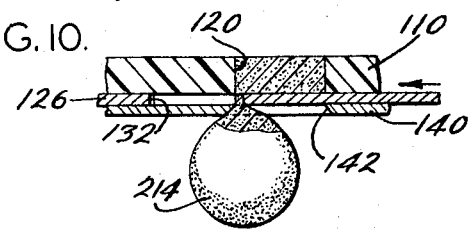
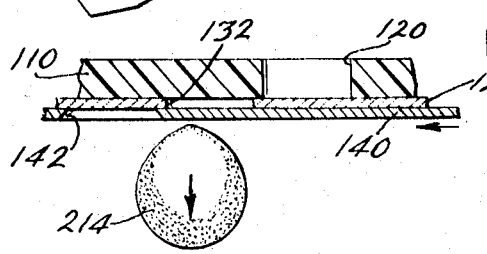
INVENTOR:
WALTER WARREN EGEE
BY Howson & Howson
ATTYS.

United States Patent Office 3,535,735
Patented Oct. 27, 1970

3,535,735
EXTRUDING APPARATUS AND SYSTEM
Walter Warren Egee, Wallingford, Pa., assignor to Campbell Soup Company, Camden, N.J., a corporation of New Jersey
Filed Feb. 16, 1968, Ser. No. 706,088
Int. Cl. A22c 7/00; A47j 43/20
U.S. Cl. 17—32                                 8 Claims

ABSTRACT OF THE DISCLOSURE

Apparatus for extruding discrete bodies of a viscous adherent substance, for example uncooked meatballs, by way of a plurality of orifices of variable area, utilizing a transversely-movable shear plate having a plurality of apertures therein registrable with the variable orifices during the extruding process and capable of rapid transverse reciprocatory motion upon termination of extrusion so as to shear the meatballs from the outer surface of the orifices and to shake them loose from the shear plate so that they will fall away freely. In the preferred embodiment for forming a multiplicity of meatballs and discharging them into a frying pan, the extrusion apparatus comprises an extrusion head having a plurality of apertures therein and a forming plate having a similar pattern of apertures which can be rotated in and out of registry with the extrusion apertures. By controlling the rate of feed of the ground meat to the inner side of the extrusion plate, in relation to the motion of the forming plate, ground meatballs are formed which tend to hang from the lower surface of the forming plate. The shear plate may be apertured in the same pattern as the forming plate and is originally oriented so as not to interfere with the extrusion process. However, when the meatballs have been completely formed, the shear plate is automatically rotated abruptly in one direction, reversed rapidly, and returned to its original position so as to shear the meatballs from the lower surface of the forming plate and to shake them loose from the shear plate.

BACKGROUND OF THE INVENTION

The invention relates to systems for forming and discharging discrete bodies of viscous adherent material, and particularly to a novel form of extrusion head for use in forming globular food products such as uncooked meatballs or the like.

There are a variety of applications in which it is desired to convert a mass of viscous adherent material into a plurality of discrete bodies of said material, and then to release them so that they may fall freely into a collecting receptacle. In some cases it is desired that a plurality of such discrete bodies be formed simultaneously and discharged simultaneously during each cycle of operation of the apparatus.

One field of application for such apparatus is in the production of food products. For example, a mass of dough may be automatically extruded through a plurality of openings to form discrete bodies which are then to be released into a cooking utensil. The present invention, however, is particularly advantageous in applications in which uncooked ground meat is to be extruded and formed into groups of meatballs and released in groups into fryer pans, each group of meatballs being formed simultaneously, the several groups being formed and released sequentially.

Apparatus is known in the prior art in which a feed screw urges ground meat against a plurality of apertures in an extruding plate and in which a rotatable multiply-apertured forming plate is disposed against the outer side of the extruding plate, the pattern of apertures in the forming plate being the same as, and registrable with, the corresponding apertures in the extruding plate, and the motion, size and location of the latter apertures being such that in a first position of the forming plate the latter apertures are completely misaligned with the extruding plate apertures; however, by rotating the forming plate forwardly and backwardly, the extruding plate apertures and the forming plate apertures can be caused to overlap by first increasing and then by decreasing amounts whereby, when the forming plate has returned to its original misregistered position a meatball has been extruded and formed at the outer surface of each of the forming plate apertures. However, due to the tackiness of the meatballs, and to some extent also due to their stringiness, the meatballs tend to cling to the outer surface of the forming plate and are not readily dislodged. This interferes with the rapid automatic production of meatballs, where for example complete groups of twenty are to be formed and discharged into a fryer during each cycle of operation.

It is therefore an object of the invention to provide new and useful apparatus for the formation and discharging of discrete bodies of viscous adherent material.

Another object is to provide such apparatus which automatically provides reliable and complete release or discharge of the bodies so formed at a desired time.

It is also an object to provide a new and useful system for automatically producing a sequence of groups of uncooked meatballs by extrusion and for assuring complete accurately timed release of the meatballs so formed.

SUMMARY OF THE INVENTION

These and other objects of the invention are achieved by the provision of an extruding head comprising a variable orifice structure against one side of which the material to be extruded is urged, and a shear plate disposed adjacent the outer side of the variable orifice structure which is operable through a rapid reciprocatory cycle of motion, which motion may be translational but preferably is rotational, to shear the extruded and formed bodies of material from the outer surface of the variable orifice structure and to shake them loose from the outer surface of the shear plate, so that all of the bodies will fall freely away from the extruding head. Preferably the shear plate has apertures therein corresponding in number and pattern to the number and pattern of the variable orifices and which, during the extrusion time, are wholly aligned with the variable orifices so as not to interfere with the forming of the discrete bodies. The shear plate is preferably reciprocated from its wholly-aligned position to a completely misaligned position and back again rapidly, so that the desired shearing action is obtained by a small excursion of the shear plate and so that the high acceleration of the shear plate when it reverses its direction of motion exerts a shaking action to insure disengagement of the severed bodies from the outer surface of the shear plate despite their tendency to adhere thereto.

In the preferred form, the variable orifice structure comprises an extruding plate having a plurality of spaced apertures extending therethrough and arranged in a predetermined pattern, one aperture for each body to be formed, and a forming plate mounted slidably against the outer surface of the extruding plate and having a plurality of apertures extending therethrough arranged in the same pattern as that of the extruding plate. The forming plate is rotatable between a position in which the apertures thereof are partially or entirely misaligned with those of the extruding plate through positions of increasing alignment and then back to a position of lesser alignment or complete misalignment. The shear plate preferably is provided with a corresponding equal number of apertures registrable with the extruding plate apertures and is operative to be triggered into an extremely rapid back-and-forth rotational motion when the extruded bodies have been formed, so as to sever connection with the forming plate and also to shake them loose from the shear plate.

Preferably the forming plate and the shear plate are controlled in their motion from a common source so as to achieve the desired timing relationship between their operations. Thus, in the preferred form, a rotating shaft which produces the rotational motion of the forming plate is operative, when it reaches a predetermined phase of its rotation, to trigger an air cylinder for producing the short cycle of shear plate operation at the desired time.

In a preferred system of the invention for producing a sequence of groups of meatballs to be dropped into a fryer, the apparatus may comprise a receptacle for uncooked ground meat, a feed screw for supplying the ground meat to an extrusion chamber, an extrusion head as described above closing the outlet end of the extrusion chamber, a motor for operating the feed screw, a mechanism connected between the motor and the feed screw for producing intermittent operation of the feed screw according to a regular predetermined pattern, means operated by the motor to move the forming plate in synchronism with the intermittent operation of the feed screw, and a microswitch arrangement for triggering an air cylinder to operate the shear plate at the desired time; the same motor may be utilized to control placement of a different fryer pan beneath the extruding head for each group of meatballs released, the motion of the fryer pans preferably taking place during the intervals of non-operation of the feed screw.

BRIEF DESCRIPTION OF FIGURES

These and other objects and features of the invention will be more readily understood from a consideration of the following detailed description, taken in connection with the accompanying drawings, in which:

FIG. 1 is an elevational side view, partly in section, illustrating apparatus for automatically producing uncooked meatballs, and embodying the invention;

FIG. 2 is a sectional view taken along lines 2—2 of FIG. 1;

FIG. 3 is a sectional view taken along lines 3—3 of FIG. 1;

FIG. 6 is a sectional view taken along lines 6—6 of FIG. 4;

FIG. 7 is a sectional view taken along lines 7—7 of FIG. 4;

FIGS. 8, 9, 10 and 11 are fragmentary sectional views illustrating different positions of components of the extrusion head shown in the preceding figures at successive phases of its operation; and FIGS. 7a, 8a, 9a, 10a and 11a are fragmentary plan views corresponding to the sectional views of FIGS. 7–11, and to which reference will be made in explaining the operation of the invention.

DESCRIPTION OF PREFERRED EMBODIMENTS

Figure 4:
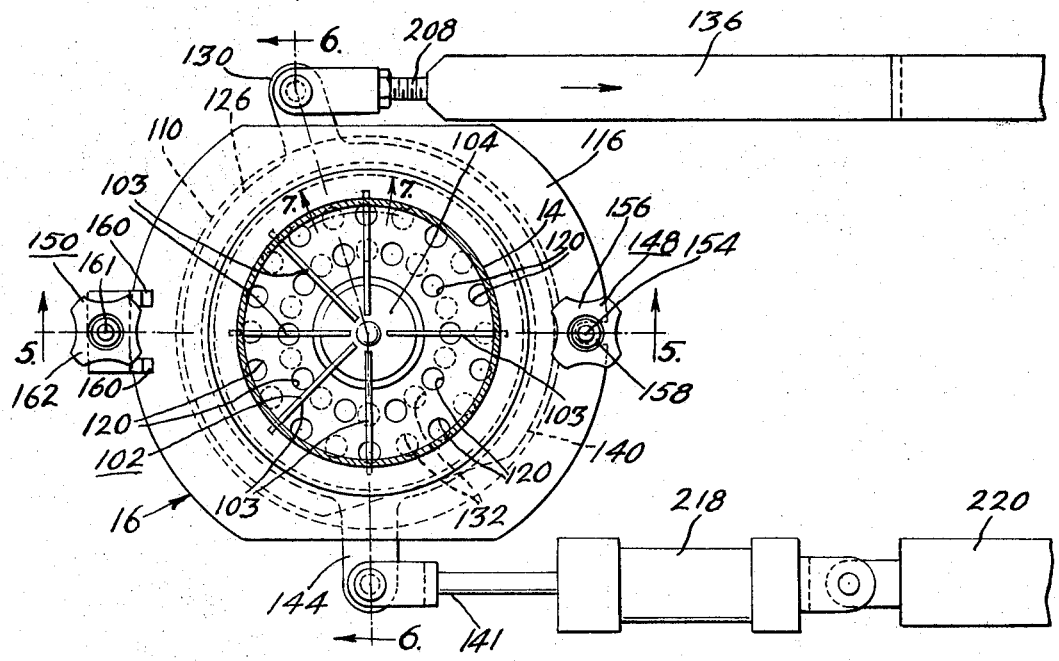
FIG. 4 is a sectional view taken along lines 4—4 of FIG. 1.

Referring now to FIG. 1 which shows, by way of example only, a system for producing sequential groups of uncooked meatballs and discharging them into fryer pans, a frame 10 supports at its top a receiving hopper 11 for uncooked ground meat, the lower portion of which contains a horizontally-disposed feed screw 12 for delivering the uncooked meat into an extruding chamber 14 and for urging it intermittently against the upper, interior surface of extruding head 16. During each cycle of operation, a group of meatballs are formed on the under exterior surface of extruding head 16 and discharged so as to fall into a chute 18 for directing them into an underlying fryer pan (not shown). In ordinary operation, one group (for example twenty) of uncooked meatballs is released into one fryer pan, another fryer pan is then advanced to beneath chute 18, the next group of meatballs formed and discharged into it, and so on repetitively as long as the apparatus is in operation. Typically the fryer pans may be carried on an automatically indexed turntable, the successive timed positions of which are controlled by a drive shaft 20 driven by a motor 22 within frame 10. As is shown particularly clearly in FIG. 3, the motor shaft 23 is positively coupled to drive shaft 20 by means of sprockets 24 and 26 and chain drive 28. Accordingly, the rotational position of drive shaft 20 is positively correlated with the motion of the fryer pans.

Drive shaft 20 is also positively coupled to the male jaw 30 of jaw clutch 32 by means of sprockets 36 and 38 and chain drive 40. Male jaw 30 is rotatable about a shaft 44, herein designated as the main drive shaft, but is fixed in position axially of the main drive shaft. Female jaw 46 of clutch 32 is axially slidable on main drive shaft 44 by means of appropriate keyways, so that the clutch may be engaged or disengaged by axial motion of female jaw 46. The latter axial motion is provided by a linkage arm 50 pivotally secured near its center to female jaw 46; the upper end of arm 50 is pivotally connected to the free end of another linkage arm 54, the opposite end of which is held fixed at 56. The lower end of linkage arm 50 is pivotally connected to one end of the plunger 58 of an air cylinder 60 mounted on frame 10.

Air cylinder 60 may be actuated by a pushbutton-operated solenoid valve (not shown) to move linkage arm 50 to the position shown in broken line, thereby to disengage clutch 32 and arrest motion of the main drive shaft 44. Such actuation shuts down the entire operation of the extruding apparatus while permitting the motor 22 to continue to run. An appropriate timer (not shown) may be utilized to shut down the motor a predetermined time after air cylinder 60 is operated; this will enable motor 22 to operate for a sufficiently long period after the extruding apparatus is shut down to permit continued operation of the fryer pan conveyor and of related apparatus which empties the cooked meatballs from the fryer pans, so that shutting down of the extruding apparatus will not leave meatballs in the fryer pans to be overcooked or burned.

Main drive shaft 44 operates feed screw 12 intermittently by means of the apparatus now to be described.

Main drive shaft 44 is mounted on bearings 64 and 66, which are supported by respective bearing supports 68 and 70 fixed to frame 10. Rotation of the main drive shaft 44 operates gear 72 in unidirectional intermittent steps by means of an eccentric crank arrangement 74 and an over-running clutch arrangement 76, shown in detail in FIG. 2. Thus an eccentric shaft 78 drives a crank arm 80 to cause oscillation of an arm 82, so that gear 72 is rotated clockwise by each downward stroke of crank 80 but is not driven during the upward stroke of the latter crank. Thus gear 72 is driven for one half of the cycle of revolution of main drive shaft 44, but not for the other. Preferably the eccentric shaft 78 can readily be changed in position to vary its eccentricity for use with extrudable meat of different densities or consistencies, while the arm 82 preferably employs a nut 86 to which arm 80 is pivoted and which threadingly engages a bearing-mounted lead screw 88 operable by an adjustment knob 90 to change the position of nut 86; this adjusts the throw of the crank and therefore the amount of rotation of feed screw 12 which is provided during each cycle of operation, as may be desired in different applications.

Gear 72 drives gear 92 in a counterclockwise direction as viewed in FIG. 2, the latter gear being secured to a shaft 94 connected to an over-running clutch 93 serving as a "backstop" for preventing any reverse rotation of shaft 94 during the intervals when the intermittent drive is absent.

Shaft 94 directly drives feed screw 12, the first portion of which is of large-diameter ribbon form and the next portion of which fits closely within a cylindrical conduit 96 in frame 10 and is of the same diameter as the first portion but of solid screw form. The feed screw extends externally of frame 10 within a cylindrical feed conduit 98, wherein it has a reduced diameter, and terminates with a few threads of reducing diameter within the delivery conduit 100.

Figure 5:
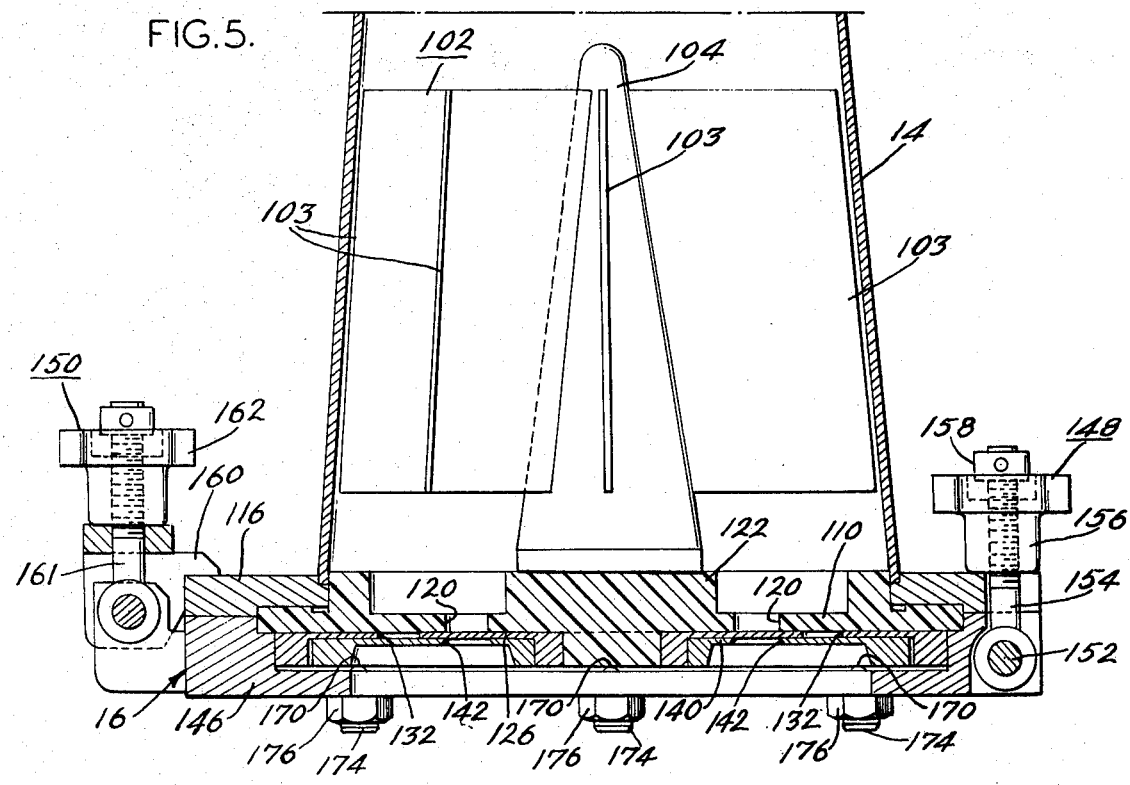
FIG. 5 is a sectional view taken along lines 5—5 of FIG. 4.

The delivery conduit 100 is in the form of a right-angle bend so that the meat is delivered downwardly into the extruding chamber 14. As shown in FIGS. 1, 4 and 5, the extruding chamber 14 preferably includes a vane assembly 102 comprising a plurality of flat vanes such as 103 extending axially and radially at different angles within the extruding chamber 14 and mounted by means of a central support 104 on the interior side of extruding head 16. These vanes serve to create a back-pressure for producing greater compaction of the meat and to prevent rotation of the compacted mass adjacent the extruding head.

Accordingly it will be appreciated that, with clutch 32 engaged, operation of motor 22 causes feed screw 12 to rotate during successive half-cycles of revolution of main drive shaft 44 with a maximum speed which is greatest near the center of each period of rotation, the amount of rotation taking place during each cycle being adjustable by the several adjustments mentioned above.

The extruding head 16, shown with particular clarity in FIGS. 4, 5 and 6, comprises an upper, interior extruding plate 110, which may be of plastic, which fits snugly within, and is secured to, the lower end of the extruding chamber 14 and a ring-shaped metal flange 116 secured to and surrounding the lower edge of the extrusion chamber. The extruding plate 110 closes the lower end of the extrusion chamber 14, except where it is provided with apertures such as 120 extending therethrough, and in this case also includes a boss 122 to which the vane support 104 may be affixed. The apertures 120 in extruding plate 110 are arranged in a predetermined pattern shown by the full-line circles in FIG. 4. While many patterns, shapes and sizes of extruding plate apertures may be utilized, in this example these apertures are arranged in two concentric rings of ten apertures each, the apertures being spaced apart from each other circumferentially by more than their diameter.

Mounted next below, and exterior to, the extruding plate and in sliding engagement therewith is a generally-circular apertured forming plate 126, which may be of metal and is provided with a radially-extending ear 130 by means of which it may be rotated concentrically with extruding plate 110. The apertures such as 132 extending through forming plate 126, shown in broken line in FIG. 4, are of the same size and arranged in the same pattern as those in extruding plate 110, and in the "closed" position of the forming plate shown in FIG. 4 the forming plate apertures 132 are positioned between, and are completely misaligned with, the extruding plate apertures 120. However, oscillating motion of forming plate 126 in response to reciprocating motion of an arm 136 pivotably secured to ear 130 causes the forming plate apertures to be moved into any desired degree of registry with the corresponding extrusion plate apertures.

Below, and in sliding contact with, the lower surface of forming plate 126 is a shear plate 140, which is mounted for rotation concentric with the forming plate by means of a reciprocable arm 141 pivotally connected to a peripherally-extending ear 144 on the shear plate. As can be seen best in FIGS. 5 and 6, shear plate 140 is provided with a plurality of apertures of a size and pattern the same as those of extruding plate 110. When not being operated to perform the shearing operation, the shear plate apertures are completely aligned with the extending plate apertures 120. The interior edges of each of the shear plate apertures 142 are preferably sharpened, as by beveling them by conventional machining operations.

The extruding head 16 is completed and held together by a generally-circular bottom plate 146 and a pair of pivotable clamps 148 and 150 mounted on diametrically opposite portions of the bottom plate. Thus, as shown in FIG. 5, a pivot 152 is mounted across a slot at one edge of the bottom plate 146 on which threaded arm 154 is pivotally mounted. A nut 156 and a nut retainer 158 are mounted on the outward end of screw-threaded arm 154 so that when arm 154 is pivoted to its upward position the nut may be tightened to bear against the upper surface of ring-shaped flange 116 and provided a clamping action between the bottom plate and the flange 116. Clamp 150 is similarly arranged and constructed, with the principal exception that it includes a pair of clamping arms 160 which are secured to flange 116 and in which arm 161 is captive, so that when nut 162 is loosened and clamp 148 released the bottom plate may be pivoted downwardly but is retained on one side of extrusion chamber 14 by clamp 150.

To maintain the extruding plate, the forming plate and the shear plate in contact with each other despite the outward pressure of the meat, a number of spring-loaded captive ball bearings such as 170 are mounted around the upper surface of bottom plate 146 to bear against and support the peripheral outer edge of the shear plate, as shown particularly clearly in FIGS. 5 and 6. Each ball is retained in the upper end-face of a screw such as 174, the screw being threadingly engaged in the bottom plate 146 and advanced until the desired degree of pressure against the underside of the shear plate is obtained. Locking nuts such as 176 may be provided on screws 174 to maintain them in their set position.

It will be appreciated that by loosening nuts 162 and 156 the pivoted bottom plate 146 may be turned downwardly to open the extrusion head and permit rapid and easy removal of the shear plate and the forming plate; after this, the extruding plate may also be removed if desired in some cases. Accordingly different plates having different numbers, forms and arrangements of apertures may readily be substituted for use in different applications to produce different shapes or sizes of products, for example.

The mechanism utilized to oscillate the forming plate is as follows, Marlin drive shaft 44 is directly coupled through bevel gears 200 to drive an eccentric 202, which in turn operates the crank arm 136 attached to ear 130 of forming plate 126. Eccentric 202 is preferably provided with an adjustment of the extent of eccentricity so as to permit selection of the throw of arm 136 and therefore the extent of oscillation of the forming plate; the end of arm 136 attached to ear 130 is preferably provided with a lengthening screw adjustment 208 which permits adjustment of the absolute angular position of the forming plate. So long as clutch 32 remains engaged, the motor 22 continuously oscillates the forming plate back and forth rotationally, into and out of alignment with the extruding plate holes and the shear plate holes.

Typical operations of the extruding head is illustrated in FIGS. 7–11. FIGS. 7 and 7a illustrate the positions of the extruding head apertures immediately prior to an extruding cycle, at which time the extruding apertures 120 and the shear plate apertures 142 are wholly aligned with each other. The forming plate aperture 132 is, at this point in the cycle, completely misaligned with the extruding plate aperture 120 and the shear plate aperture 142, so that there is no orifice extending entirely through the extruding head. However, when main drive shaft 44 reaches the point in its cycle where feed screw 12 begins to rotate and to apply pressure to the meat in extruding chamber 14, the same main drive shaft has caused arm 136 to move to the position represented in FIGS. 8 and 8a, in which the forming plate aperture 132 begins to overlap the extruding plate aperture 120, and a small amount of the meat is extruded to begin the formation of the meatball 214. As the rate of rotation of the feed screw 12 increases to a maximum, the forming plate 126 is turned to the position shown in FIGS. 9 and 9a in which the forming plate aperture 132 is exactly aligned with the extruding plate apertures 120 and meatball 214 has increased in size to a relatively large diameter. As the cycle continues, the speed of the feed screw 12 reduces and the forming plate 126 returns to the position shown in FIGS. 10 and 10a in which there is again only a very slight overlap between the extruding plate aperture and the forming plate aperture; a short brief time thereafter the forming plate completely closely the orifice through the extrusion head and the feed screw 12 stops. This synchronized motion between the feed screw and the forming plate is provided by operating them both from the same main drive shaft 44, as described previously.

At the point in the cycle illustrated in FIGS. 10 and 10a, the meatball 214 tends to remain hanging from the forming plate 126, primarily because of adherence due to the tacky and stringy nature of the meat. It will be understood that, in the embodient shown, twenty meatballs like that shown at 214 are formed simultaneously in the same way, one by each of the forming apertures.

Except for the special form of extruding head 16 and the apparatus for synchronously operating the shear plate therein, the portion of the apparatus thus far described in detail corresponds in general outline to previously-known meatball extruding systems and hence need not be described in further detail.

The detailed nature of the extruding head 16 and the apparatus for operating it will now be described. Mounted on main drive shaft 44 is a rotary cam 210 having a single raised cam surface at a point on its periphery such as to operate a microswitch 215 once each cycle when the main drive shaft reaches a point corresponding to a time, following the point illustrated in FIG. 10, at which the meatballs have been pinched-off from the extruding apertures by motion of the forming plate to its "closed" position. Operation of the microswitch 215 then actuates a conventional solenoid valve 216, which in turn is connected so as to trigger a conventional single-cycle air cylinder 218 mounted on a fixed support 220. Triggering of air cylinder 218 causes one very rapid cycle of reciprocation of plunger arm 142 of the air cylinder, which in turn causes one cycle of rapid oscillation of shear plate 140 forwardly and backwardly, by an amount and at a rate sufficient not only to shear the meatballs such as 214 from the forming plate but also to shake them loose from the shear plate so that they all fall freely into the chute 18 beneath the extruding head 16. Preferably the time of actuation of the shear plate is late in the "rest" period of the feed screw, i.e. just prior to the beginning of the next cycle of operation of the feed screw.

This latter operation is also illustrated in FIGS. 7–11. More particularly, in FIGS. 7–10 the shear plate is at rest with its apertures 142 directly aligned with the extruding apertures 120, and remains so throughout the extruding cycle. However, at the point in the extruding cycle when the meatballs have been completely formed and are hanging from the forming plate, the extruding plate rotates very rapidly to the position shown in FIGS. 11 and 11a, during which motion the beveled, sharp, interior edges of the shear plate apertures shear all of the meatballs from the forming plate. At the position shown in FIGS. 11 and 11a, the shear plate rapidly reverses its motion to begin return to the original position shown in FIGS. 7 and 7a for example. At the time of this latter abrupt reversal of motion, the corresponding rapid acceleration of the shear plate shakes the meatballs free of the shear plate to discharge them all into the receiving chute 18. Appropriate cams, microswitches, solenoid valves and air cylinders suitable for providing the above-described synchronized operation of the shear plate, with a very short cycle of the order of hundreths of a second, are well known in the art and need not be described in detail.

When the group of twenty meatballs has thereby been simultaneously delivered through chute 18 to an underlying fryer pan, the motor 22 continues to operate during the succeeding half-cycle of the main drive shaft 44 so as to advance a new fryer pan under the chute 18, and the above-described cycle then repeats itself, whereby sequential groups of twenty meatballs at a time are discharged into successive fryer pans.

From the foregoing it will be apparent to one skilled in the art that the extruding plate, the forming plate and the shear plate may all have forms and motions quite different from those specifically described, the essential function of the shear plate being to provide a rapid shearing and shaking action on the lower, outer surface of the extruding head so as to provide the necessary rapid and reliable release of all of the meatballs.

Thus, while the invention has been described in the interests of definiteness with specific reference to a particular embodiment thereof, it will be understood that it may be embodied in any of a large variety of forms different substantially from those described without departing from the scope of the invention as defined by the appended claims.

What is claimed is:

1. Extruding head apparatus for extruding viscous adherent material, comprising:

variable orifice means comprising an extruding plate and a forming plate laterally movable with respect to said extruding plate, said variable orifice means being responsive to urging of said material against one side thereof during operation of said forming plate to form at least one extruded adherent body of said material at the outer side of said variable orifice means;

shear means secured to said variable orifice means and movable in a rapid shearing motion across the region of adherence of said material to shear said material from said outer side of said variable orifice means; and automatic actuating means for providing said shearing motion, and for imparting a sudden change in velocity to said shear means after said material has been sheared from said variable orifice means thereby to free said material from said shear means;

said shear means comprising a plate rotatable adjacent said outer side of said variable orifice means, said plate having an aperture surrounding said extruded adherent body of said material as it is extruded, said actuating means rotating said plate by an amount such that the edges of said aperture shear said material from said variable orifice means.

2. The extruding head of claim 1, in which said edges of said aperture are cutting edges.

3. The extruding head of claim 1, in which said actuating means comprises means for oscillating said plate rotationally through a rapid cycle of movement.

4. Extruding head apparatus for forming and discharging discrete bodies of a viscous adherent material comprising:

an extruding plate having a plurality of spaced apertures extending therethrough and arranged in a predetermined pattern;

a forming plate having a plurality of apertures extending therethrough and arranged in a pattern registrable with said pattern of extruding plate apertures, said forming plate being disposed adjacent and parallel to one side of said extruding plate and movable between a first position in which a larger area of each of said forming plate apertures is aligned with said extruding plate apertures and a second position in which a smaller area of each of said forming plate apertures is aligned with said extruding plate apertures;

a shear plate having a plurality of apertures extending therethrough and arranged in a pattern registrable with said pattern of said extruding plate, said shear plate being disposed adjacent and parallel to the side of said forming plate opposite said extruding plate and movable between a first position in which said apertures thereof are in at least partial registry with those of said extruding plate and a second position in which said shear plate apertures are completely misregistered with said forming plate apertures;

means for moving said forming plate laterally with respect to said extruding plate between said first and second positions to vary the area of alignment between said apertures of said extruding plate and those of said forming plate, while maintaining said shear plate apertures in registry with said extruding plate apertures; and means for moving said shear plate rapidly between said first and second positions and back to said first position to shear off and free bodies of said material extruded through said forming plate.

5. The extruding head apparatus of claim 4, in which said shear plate is rotatable between said first and second positions thereof and in which said moving means for said shear plate comprises means for oscillating said shear plate rotationally between said first and second positions thereof.

6. The apparatus of claim 5, in which said moving means for said shear plate comprises a rapid-action air cylinder having a reciprocable plunger for effecting rapid rotational oscillation of said shear plate.

7. A system for forming and discharging groups of uncooked meatballs, comprising:
   an extruding plate having a plurality of apertures extending through it;
   an extruding chamber contiguous said extruding plate for delivering uncooked ground meat to one side of said extruding plate;
   feed screw means rotatable to urge said delivered meat against said one side of said extruding plate;
   a forming plate rotatable adjacent the opposite side of said extruding plate and having a pattern of apertures extending therethrough substantially the same as the pattern of said extruding plate apertures, whereby rotation of said forming plate with respect to said extruding plate provides different degrees of alignment between said extruding plate apertures and said forming plate apertures;
   drive means for producing synchronous rotation of said feed screw means and of said forming plate means thereby to form a plurality of extruded meatballs attached to the outer side of said forming plate;
   a shear plate rotatable contiguous said outer side of said forming plate and having a pattern of apertures extending therethrough substantially the same as the pattern of said forming plate apertures; and
   means responsive to attainment of a predetermined position by said drive means for initiating a rapid oscillatory cycle of rotation of said shear plate while said meatballs are attached to said forming plate to shear them from said forming plate and to free them from said shear plate.

8. The system of claim 7, in which said last-named means comprises cam-operable electrical switch means, cam means on said drive means for operating said switch means, solenoid-operated valve means actuatable in response to operation of said switch means, and an air cylinder having a plunger connected eccentrically to said shear plate and responsive to actuation of said valve means to move said plunger through a rapid reciprocatory cycle.

References Cited
UNITED STATES PATENTS

| | | | |
|---|---|---|---|
| 2,363,218 | 11/1944 | Yuill | 17—32 |
| 2,500,973 | 3/1950 | Ackerman | 17—32 |
| 2,926,557 | 3/1960 | Ford | 17—32 X |
| 3,292,207 | 12/1966 | Herrick | 17—32 |

LUCIE H. LAUDENLAGER, Primary Examiner

U.S. Cl. X.R.

107—14